US009280473B2

(12) United States Patent
Mondal et al.

(10) Patent No.: US 9,280,473 B2
(45) Date of Patent: Mar. 8, 2016

(54) METHOD AND APPARATUS FOR ACCESSING PHYSICAL MEMORY FROM A CPU OR PROCESSING ELEMENT IN A HIGH PERFORMANCE MANNER

(75) Inventors: Sanjoy K. Mondal, San Marcos, TX (US); Rajesh B. Patel, Austin, TX (US); Lawrence O. Smith, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 370 days.

(21) Appl. No.: 11/004,753

(22) Filed: Dec. 2, 2004

(65) Prior Publication Data

US 2006/0123184 A1 Jun. 8, 2006

(51) Int. Cl.
*G06F 12/08* (2006.01)
*G06F 9/30* (2006.01)
*G06F 12/10* (2006.01)

(52) U.S. Cl.
CPC .......... *G06F 12/0862* (2013.01); *G06F 9/3016* (2013.01); *G06F 9/30149* (2013.01); *G06F 9/30181* (2013.01); *G06F 12/10* (2013.01); *G06F 12/1027* (2013.01); *G06F 12/0888* (2013.01)

(58) Field of Classification Search
None
See application file for complete search history.

(56) References Cited

U.S. PATENT DOCUMENTS

| | | | | |
|---|---|---|---|---|
| 5,157,777 A | * | 10/1992 | Lai et al. | 711/202 |
| 5,317,754 A | | 5/1994 | Blandy et al. | |
| 5,623,619 A | * | 4/1997 | Witt | 711/3 |
| 5,715,418 A | * | 2/1998 | Atsatt et al. | 711/202 |
| 5,732,404 A | * | 3/1998 | Johnson et al. | 711/2 |
| 5,752,274 A | * | 5/1998 | Garibay et al. | 711/206 |
| 5,895,503 A | * | 4/1999 | Belgard | 711/202 |
| 5,913,923 A | * | 6/1999 | Dunlap et al. | 710/100 |
| 5,960,466 A | * | 9/1999 | Belgard | 711/213 |
| 5,963,984 A | * | 10/1999 | Garibay et al. | 711/206 |
| 6,219,774 B1 | * | 4/2001 | Hammond et al. | 711/202 |
| 6,351,806 B1 | | 2/2002 | Wyland | |

(Continued)

FOREIGN PATENT DOCUMENTS

| | | |
|---|---|---|
| EP | 034 5589 | 12/1989 |
| EP | 124 1579 | 9/2002 |

(Continued)

OTHER PUBLICATIONS

R.-M.Shiu, J.-C. Chiu, S.-K.Cheng and J.J.-J.Shann, "Decoding of CISC instructions in superscalar processors with high issue rate," Mar. 14 2000, IEE Proc.—Comput. Digit. Tech, vol. 147, No. 2, pp. 101-107.*

(Continued)

*Primary Examiner* — Charles Rones
*Assistant Examiner* — Matthew Chrzanowski
(74) *Attorney, Agent, or Firm* — Lowenstein Sandler LLP

(57) ABSTRACT

A method and apparatus is described herein for accessing a physical memory location referenced by a physical address with a processor. The processor fetches/receives instructions with references to virtual memory addresses and/or references to physical addresses. Translation logic translates the virtual memory addresses to physical addresses and provides the physical addresses to a common interface. Physical addressing logic decodes references to physical addresses and provides the physical addresses to a common interface based on a memory type stored by the physical addressing logic.

17 Claims, 4 Drawing Sheets

(56) References Cited

U.S. PATENT DOCUMENTS

| | | | |
|---|---|---|---|
| 6,363,470 B1* | 3/2002 | Laurenti et al. | 711/220 |
| 6,430,668 B2* | 8/2002 | Belgard | 711/202 |
| 6,470,444 B1* | 10/2002 | Sheaffer | 712/217 |
| 6,496,847 B1 | 12/2002 | Bugnion et al. | |
| 6,658,578 B1* | 12/2003 | Laurenti et al. | 713/324 |
| 6,748,512 B2* | 6/2004 | Buch et al. | 711/202 |
| 6,785,886 B1* | 8/2004 | Lim et al. | 718/1 |
| 6,954,837 B2* | 10/2005 | Woo et al. | 711/170 |
| 7,937,525 B2 | 5/2011 | Mondal et al. | |
| 2002/0073296 A1* | 6/2002 | Buch et al. | 711/202 |
| 2003/0018877 A1* | 1/2003 | Gaskins et al. | 711/207 |
| 2004/0073741 A1* | 4/2004 | Klein | 711/3 |
| 2004/0073766 A1* | 4/2004 | Arimilli et al. | 711/202 |
| 2004/0193829 A1* | 9/2004 | Woo et al. | 711/170 |
| 2005/0114610 A1* | 5/2005 | Robinson et al. | 711/152 |
| 2006/0123184 A1* | 6/2006 | Mondal et al. | 711/6 |

FOREIGN PATENT DOCUMENTS

| | | |
|---|---|---|
| JP | 01-106149 A | 4/1989 |
| JP | 02236652 A | 9/1990 |
| JP | 07-093221 A | 4/1995 |
| JP | 08-272693 A | 10/1996 |
| JP | 2000122916 A | 4/2000 |
| JP | 2002-288038 A | 10/2002 |
| WO | 2006/060220 A2 | 6/2006 |
| WO | 2006/060220 A3 | 2/2007 |

OTHER PUBLICATIONS

Webopedia, "http://www.webopedia.com/TERM/R/register.html", Webopedia.com, Oct. 30, 2001, pp. 1-3.*

U.S. Appl. No. 10/876,509, filed Jun. 25, 2004, entitled "A Virtual Machine Control Structure Identification Decoder;" Sanjoy Mondal et al.

International Preliminary Report on Patentability and Written Opinion received for PCT Application No. PCT/US2005/042154, mailed on Jun. 14, 2007, 10 pages.

Office Action Received for German Patent Application No. 11 2005 003 098.9 mailed on Jun. 12, 2009, 7 Pages of Office Action including English Translation.

Office Action Received for German Patent Application No. 11 2005 003 098.9 mailed on Jan. 24, 2008, 15 Pages of Office Action including English Translation.

Office Action Received for Chinese Patent Application No. 200580046263.5 mailed on Aug. 8, 2008, 14 Pages of Office Action including English Translation.

Office Action Received for Japanese Patent Application No. 2007-544385 mailed on Jun. 15, 2010, 4 Pages of Office Action including English Translation.

Office Action Received for German Patent Application No. 11 2005 003 098.9 mailed on Sep. 1, 2010, 12 Pages of Office Action including English Translation.

Office Action Received for Chinese Patent Application No. 200580046263.5 mailed on Aug. 7, 2009, 7 Pages of Office Action including English Translation.

Office Action Received for Chinese Patent Application No. 201010128183.7 mailed on Apr. 11, 2011, 20 Pages of Office Action including English Translation.

Office Action Received for Japanese Patent Application No. 2007-544385 mailed on Jul. 12, 2011, 4 Pages of Office Action including 2 pages of English Translation.

Chinese Patent Office, Second Office Action mailed Jan. 18, 2012 in Chinese application No. 201010128183.7.

The State Intellectual Property Office of the People's Republic of China, Office Action mailed Jul. 3, 2012 in Chinese application No. 201010128183.7.

German Patent and Trademark Office, Decision mailed Jul. 5, 2012 and Minutes of the Apr. 7, 2012 Hearing in German application No. 11 2005 003 098.9.

Notice of Allowance received for Chinese Patent Application No. 200580046263.5, mailed on Nov. 27, 2009, 4 pages of Notice of Allowance including 2 pages of English Translation.

Notice of Allowance received for Chinese Patent Application No. 201010128183.7, mailed on Jul. 17, 2013, 4 pages of Notice of Allowance including 2 pages of English Translation.

Office Action received for Chinese Patent Application No. 201010128183.7, mailed on Mar. 4, 2013, 7 pages of Office Action including 4 pages of English Translation.

PCT/US2005/042154 International Search Report and Written Opinion dated Sep. 10, 2006.

* cited by examiner

METHOD AND APPARATUS FOR ACCESSING PHYSICAL MEMORY FROM A CPU OR PROCESSING ELEMENT IN A HIGH PERFORMANCE MANNER

FIELD

This invention relates to the field of processors and, in particular, to accessing memory with a processing element.

BACKGROUND

As processing resources have increased, demands to run multiple software programs and operating systems on a single microprocessor have also increased. An environment, referred to as virtual machine extension (VMX) architecture, typically, allocates a single processor's resources to various software application and operating systems. Therefore, a single microprocessor's or multiple processing element's resources may be divided between multiple operating systems and multiple applications, which allows a user to potentially increase their usage on a computing platform.

Typically, in a VMX environment, a virtual machine monitor (VMM) program interfaces with one or more software programs, such as a virtual machine (VM) program, and a single or multiple microprocessors. A virtual machine (VM) may include guest software, such as an operating system (OS) or other software applications. Usually, to allow multiple VMs to run on a single processor the state information and control information for the VMM and each VM program is stored in memory.

One structure commonly used for storing such state and control information is a virtual machine control structure (VMCS). Storing the VMCS in the microprocessor can potentially make addressing the VMCS architecture specific; therefore, the VMCS is typically located in a portion of main system memory.

However, locating the VMCS in system memory usually creates addressing limitations for micro-processors that use virtual memory addressing. Typically, a microprocessor that utilizes virtual memory generates a linear address for a memory location to be fetched or written to. That linear address is translated by a translation unit in the microprocessor to a physical address of the memory location in a system memory. Although, the VMCS portion of the system memory may be addressed in this manner, errors in the translation process, such as a page fault, are difficult to handle in a VMX environment. Therefore, many instructions, such as VMWRITE, VMREAD, and other VMX instructions, physically address a memory location in system memory, rather than providing a linear address to be translated.

In a microprocessor that utilizes virtual memory paging, a VMX instruction may need to access physical memory directly without linear to physical address translation however, current systems usually require disabling the virtual memory paging and flushing of the linear to physical address translation buffer before a direct physical address access to memory can occur. The amount of time needed to disabling paging and flush the translation buffer typically incurs a large execution time penalty.

BRIEF DESCRIPTION OF THE DRAWINGS

The present invention is illustrated by way of example and not intended to be limited by the figures of the accompanying drawings.

DETAILED DESCRIPTION

In the following description, numerous specific details are set forth such as a specific virtual machine environment, specific components, and specific functional blocks in order to provide a thorough understanding of the present invention. It will be apparent, however, to one skilled in the art that these specific details need not be employed to practice the present invention. In other instances, well known components or methods, such well-known functional blocks of a microprocessor, etc., have not been described in detail in order to avoid unnecessarily obscuring the present invention.

Figure 1:
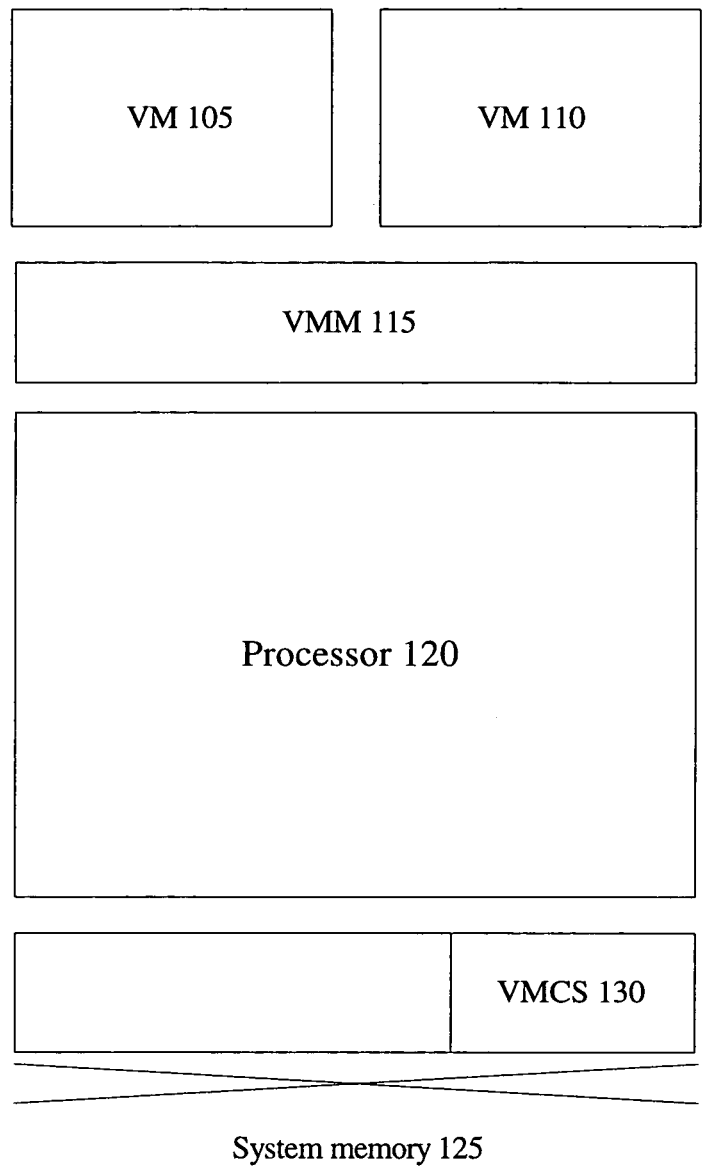
FIG. 1 illustrates an embodiment a system with two virtual machines, a virtual machine monitor, a processor, and a system memory.

FIG. 1 illustrates a virtual machine environment for interfacing guest software, also known as a virtual machine or a virtual machine program, with a processor 120. Specifically, FIG. 1 depicts a first virtual machine 105 and a second virtual machine 110. Virtual machines 105 and 110 may be any one of or any combination of the following: an operating system, an operating system specific application, a general application, software routines, or any other program that may be run on processor 120. In one embodiment, processor 120 has multiple logical processors. In another embodiment, processor 120 is one of multiple physical processors in a system.

FIG. 1 also illustrates a virtual machine manager (VMM) 115 to interface virtual machine 105 and virtual machine 110 with processor 120. In one embodiment, state and control information for VM 105, VM 110, and VMM 115 is stored in system memory 125. An example, FIG. 1 depicts virtual machine control structure (VMCS) 130 residing in system memory 125 to store the state and control information for VM 105, VM 110, and VMM 115. Although, FIG. 1 depicts VMCS 130 as residing in system memory 125, VMCS may reside in any memory structure located in the system, including a memory residing in processor 120 or a memory merely coupled to processor 120, such as system memory 125. As an advantage, if the VMCS resides in main system memory, then an instruction may reference a specific physical address merely supplying an offset to be added to an already established base address for the VMCS portion. This type of offset addressing typically reduces the architectural specific implementation problems that are associated with placing physically addressed memory in a microprocessor. However, VMCS portion 130, as stated above is not limited to residing in system memory 125.

In one embodiment, VM 105 and 110, as well as VMM 115 issue instructions that linearly address system memory 125. Processor 120 then translates the linear addresses to physical addresses in system memory 125. In another embodiment, VM 105, VM 110, or VMM 115 issues an instruction that physically addresses system memory 125. Processor 120 then directly accesses the physical address in system memory 125 without address translation. Processor 120 and address translation will be discussed in more detail in reference to FIG. 2.

System memory 125 may be any type of access memory used in a system. In one embodiment, system memory 125 is a random access memory (RAM) device such as a static random access memory (SRAM), a dynamic random access memory (DRAM), a single data rate (SDR) RAM, a double data rate (DDR) RAM, any other multiple data rate RAM, or any other type of access memory. In another embodiment, system memory 125 is any other storage device associated with processor 120, including a hard-drive, a remotely located storage device, or any other short or long-term storage device.

Figure 2:
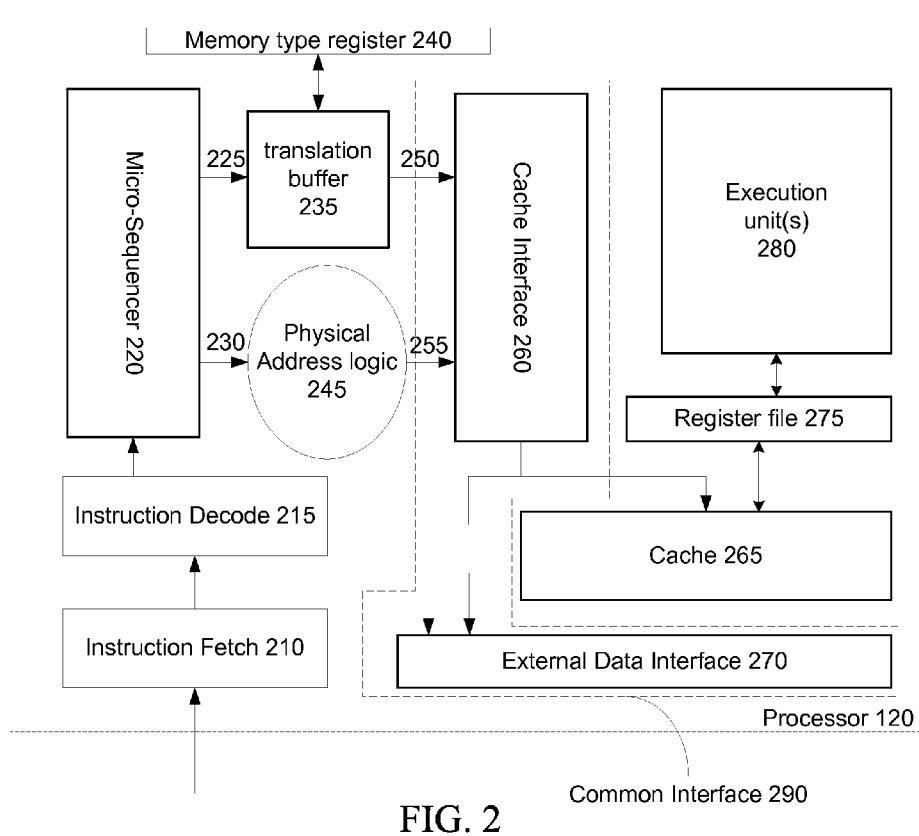
FIG. 2 illustrates a partial functional block diagram of the processor depicted in FIG. 1.

Turning to FIG. 2, an exemplary embodiment of processor 120 is illustrated. In one embodiment, processor 120 is a microprocessor capable of operating independently of another processor. In another embodiment, processor 120 is a co-processing element that operates in conjunction with other processing elements.

In one embodiment processor 120 includes a fetch unit, such as instruction fetch 210, which comprises logic for fetching and/or receiving instructions. As an example, an instruction includes a single operation to perform on a single or multiple data operands. As another example, an instruction includes multiple operations, also referred to as micro-operations, to be performed on a single or multiple data operands. An instruction that includes a plurality of operations is commonly referred to as a macro-instruction, while the individual operations are commonly referred to as micro-operations. As an example, a macro-instruction to operate on two data operands may include a plurality of micro-operations, wherein a first micro-operation instructs processor 120 to load a first data operand, a second micro-operation instructs processor 120 to load a second data operand, and a third micro-operation instructs processor 120 to operate on the first and second data operand. In one embodiment, instruction fetch unit 210 fetches fixed length instructions. In another embodiment, instruction fetch unit 210 fetches variable length instructions. In yet another embodiment, instruction fetch unit 210 fetches x86 instructions.

Processor 120 may also include instruction decode 215. In one embodiment, instruction decode 215 is a decode unit or decode logic for decoding instructions fetched by instruction fetch 210 including fixed length, variable length, and x86 instructions. As an example, decode logic decodes instructions fetched by instruction unit 210 into their individual micro-operations. In one embodiment, instruction decode 215 includes a micro-code read only memory for decoding complex instructions. In another embodiment, instruction decode 215 includes a low-level cache for storing recently fetched instruction or for storing recently decoded instructions. In yet another embodiment, instruction decode 215 includes branch prediction or speculation logic to aid in speculative instruction decode and execution.

Processor 120 also illustrates a micro-sequencer 220 coupled to instruction decode 215 and instruction fetch 210. In one embodiment, processor 120 is an in-order execution processor, which executes instructions and micro-operations in order as they are fetched and decoded. In one embodiment of an in order processor, fetched instructions are decoded and executed directly from the decode logic or cache storing decoded instructions. In an alternate embodiment, micro-sequencer 220 is present in the in-order execution processor to receive, pass-on, and track decoded micro-operations from instruction decode 215 and an instruction cache, not depicted.

In another embodiment, processor 120 is an out of order execution processor, wherein instructions and micro-operations are re-ordered and executed non-speculatively and/or speculatively. Therefore, micro-sequencer 220 may include out of order execution logic to execute micro-operation out of order and to track the micro-operations execution status, branch predication and update logic to track speculative branch execution and to update the status of each micro-operations execution status, retirement logic to validate the success of speculative branch execution, and other logic to execute instructions out of order. Both in-order execution and out-of-order execution processor design is well-known.

In one embodiment, a fetched and decoded instruction references or includes a micro-operation that references a virtual memory/linear address. In another embodiment, a fetched and decoded instruction references or includes a micro-operation that references a physical address. In yet another embodiment, a macro-instruction with a plurality of micro-operations includes a micro-operation that references a linear address and a micro-operation that references a physical address.

In one embodiment, linear addresses are passed to translation buffer 235, which is also typically referred to as a linear to physical address translator, a linear address translation unit, and a translation look-aside buffer (TLB). In one embodiment, translation buffer 235 receives a reference to a linear address and provides a representation of a physical address to a common interface, such as common interface 290. Common interface 290 will be discussed in more detail below.

Often a linear address is referred to as a virtual memory address in a processor that has virtual memory paging enabled. The reference to the linear address passed to translation buffer 235, in one embodiment, includes the linear address itself. In another embodiment, the address passed to translation buffer 235 includes a coded representation of the linear address or some other reference to a linear address that is decoded or manipulated to obtain a representation of a physical address. It is apparent that the virtual memory address is not limited to a linear address, but rather, is any form of virtual memory address that may be translated to a physical address.

In one embodiment, translation buffer 235 includes a look-up table for translating a virtual memory address to a physical address. In another embodiment, translation buffer 235 also includes translation logic to decode the input virtual memory address into a physical address. In yet another embodiment, translation buffer 235 includes or is associated with memory type register 240. In one embodiment, memory type register (MTR) 240, which is also referred to as a memory type read register (MTRR), reads and/or stores a memory type for common interface 290. As an illustrative example, a memory type readable or storable by MTR 240 is cacheable. In one embodiment when MTR 240 stores a cacheable memory type, translation buffer 235 provides a representation of a physical address to common interface 290, which is a cache interface, such as cache interface 260. In one embodiment, the representation of the physical address includes the actual physical address. In another embodiment, the representation of the physical address includes a tag for storing/writing the physical address in/to cache 265.

Another illustrative example of a memory type to be stored in MTR 240 is an un-cacheable memory type. In one embodiment, translation buffer 235 provides the translated representation of a physical address to common interface 290. In one embodiment common interface 290 is a data interface or data fetch logic, such as external data interface 270.

As an illustrative example, common interface 290 may be any interface logic operable to load a data operand associated with a physical address in processor 120, to request/fetch elements from the physical address in processor 120 or a system processor 120 is present in, or to snoop/fetch elements referenced by the physical address in a cache, such as cache 265. In one embodiment, an element includes a data operand. In another embodiment, an element includes an instruction. In yet another embodiment, an element includes a portion of state or control information. However, an element is not limited to an instruction, a data operand, state information, or control information.

Processor 120 may also include physical address logic 245, also referred to as physical addressing logic or a physical address unit. In one embodiment, physical address logic 245 takes a reference to a physical address and provides a representation of a physical address to common interface 290. As a first example, a reference to a physical address includes the physical address itself. As a second example, a reference to a physical address includes an offset from a base address in a physical memory. As a third example, a reference to a physical address includes a coded representation of a physical address or offset.

Figure 3:
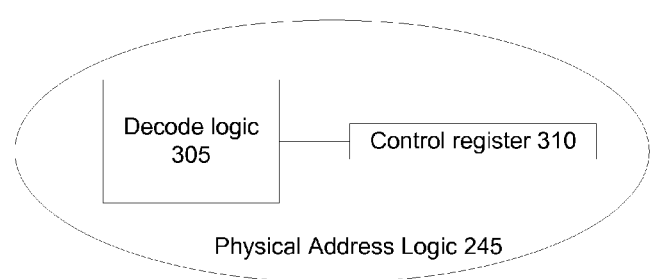
FIG. 3 illustrates an embodiment of the physical address logic depicted in FIG. 2.

In one embodiment, physical address logic, as shown in FIG. 3, also includes decode logic 305. As an example, decode logic 305 is operable to decode a coded physical address and/or generate a physical address from a supplied offset in the instruction or micro-operation. As a specific example, an earlier micro-operation supplies a base address for physical address logic 245 to use for future micro-operations. A later micro-operation includes a representation, which includes a coded representation of an offset. Physical address logic 245 decodes the offset and generates a physical address by adding the base address and offset. In another embodiment, the reference to the physical address is decoded by physical address logic 245 to also point to the next micro-operation for micro-sequencer 220 to supply. Co-pending application with Ser. No. 10/876,509 entitled Virtual Machine Control Structure Identification Decoder serial, discusses in more detail an example of an ID decode engine that may be used in physical address logic 245 to take a reference to a physical address and to provide a representation of the physical address.

In yet another embodiment, physical address logic 245 includes or is associated with control register 310, as shown in FIG. 3, to store a memory type. As a first example, a stored memory type is cacheable, also referred to as write-back (WB). As a second example, a stored memory type is un-cacheable (UC). In one embodiment, memory type register 240 and control register 310 stores the same memory type. In an alternate embodiment, memory type register 240 and control register 310 stores a different memory type.

As a first illustrative example, processor 120 includes at least physical address logic 245 with control register 310, translation buffer 235 associated with MTR 240 to store a cacheable memory type, cache interface 260, cache 265, and external data interface 270. Therefore, when a virtual memory address is translated by translation buffer 235, it checks the memory type stored in MTR 240 and provides the translated representation of a physical address to cache interface 260. Cache interface 260 checks cache 265 to see if a valid copy of the element that the translated physical address references is present. If cache 265 has a valid copy of the element, then the element is read from cache 265 into logic within processor 120, such as register file 275. Additionally, if a valid copy is not present in cache 265, external data interface 270 or some other data fetching logic reads the element referenced by the physical address from a location in a memory.

Continuing the example from above, in one embodiment, control register 310 stores an un-cacheable memory type. Even though, memory type register 240 stores a memory type of cacheable, control register 310 is not limited to the same memory type stored by MTR 240. If control register 310 did store a cacheable memory type, then physical address logic 245 provides the physical address to cache interface 260 and the same look-up process as described above occurs. However, if physical address logic 245 checks control register 310 and control register 310 stores an un-cacheable memory type, then physical address logic 245 provides a representation of a physical address directly to data fetching logic, such as external data interface 270. External data interface 270 then fetches the element from a memory location referenced by the physical address.

Although, control register 310 in the example above stored a memory type different from MTR 240, in another embodiment, physical address logic 245 reads MTR 240 and then stores that same memory type in control register 310. However, physical address logic is not limited to included or being associated with control register 310. In yet another embodiment, physical address logic 245 reads the memory type from MTR 240.

The examples above used write/stores as an example; however, in another embodiment, the same apparatus and methods are applicable to write and other instructions that include references to either virtual memory addresses or physical address. Modifying the illustrative example from above, if a write occurs, then the physical address of an element to be written to memory is provided to either cache interface 260 and/or external data interface 270. If the memory type is cacheable the element is written to cache 265 and then to a memory location by cache 265 or external data interface 270. If the memory type is un-cacheable the element is directly written to the memory location by external data interface 270.

Processor 120 may also include register file 275 and execution unit(s) 280. In one embodiment, register file 275 is operable to load and store data operands, as well as providing those data operands to execution resources, such as execution unit(s) 280. In one embodiment, execution unit(s) 280 is capable of operating on single or multiple data operands in serial and/or in parallel.

Although not specifically depicted, in other embodiments of processor 120 any one, any plurality, or any combination of the following may also be included in processor 120: a data path, an instruction path, arithmetic logic unit (ALU), a floating point calculation unit capable of executing a single instruction or multiple instructions to operate on single or multiple data operands in serial or in parallel, architecture state register(s), a bus controller, an interrupt controller, and an advanced programmable interrupt controller (APIC), a pre-fetch unit.

Figure 4:
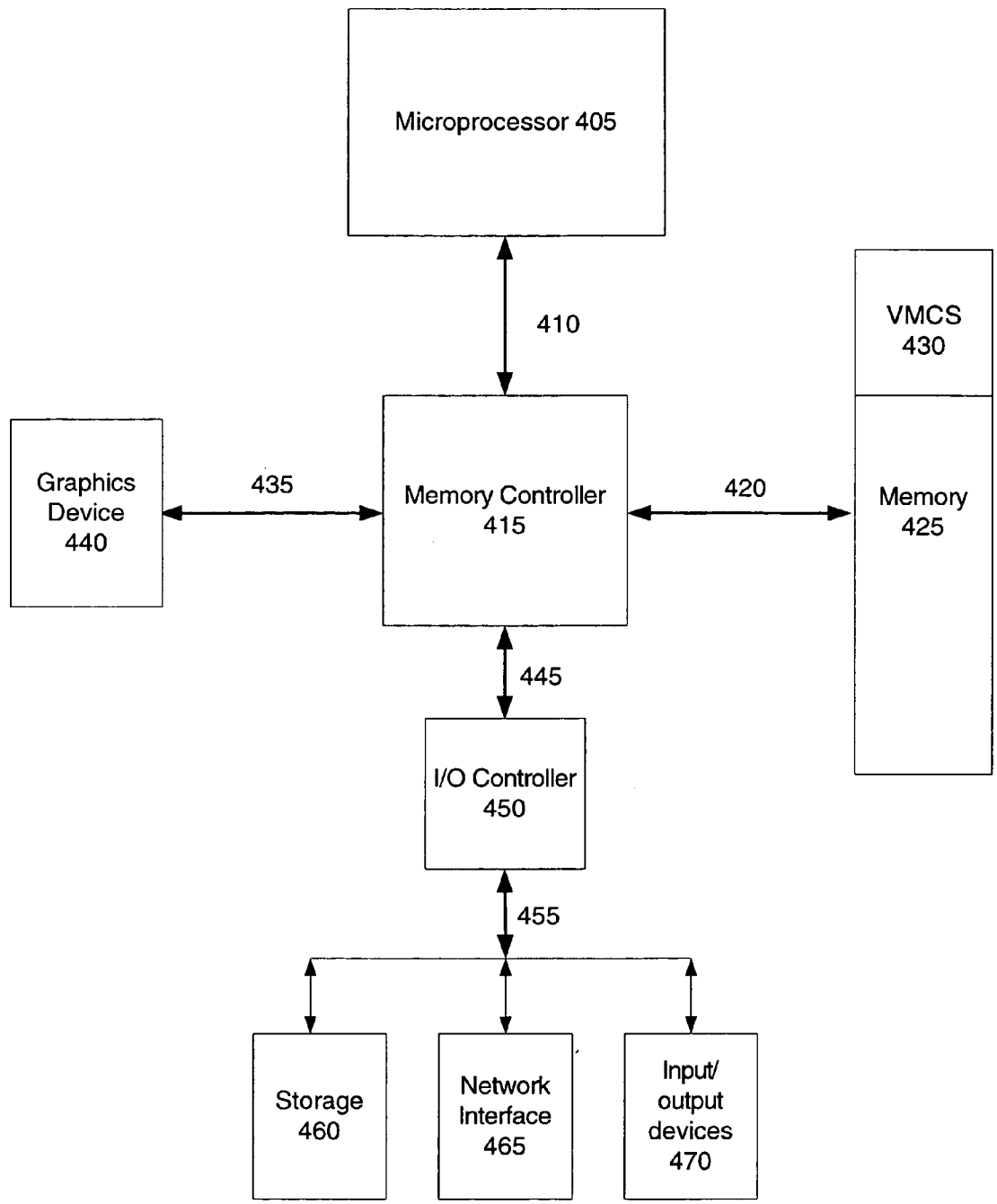
FIG. 4 illustrates an embodiment of a system having a microprocessor and a memory with a virtual machine control structure.

Turning to FIG. 4, an embodiment of a system is depicted that includes physical address logic 245 and VMCS 430. Microprocessor 405 is shown coupled by interconnect 410 to memory controller 415. Memory controller 415 is coupled to a graphics device 440 by interconnect 435. In an alternate embodiment, graphics device 440 is integrated in memory controller 415. Memory controller 415 is coupled to memory 425 by interconnect 420. In one embodiment, memory 425 is a system memory. In another embodiment, memory 425 is any memory device located in the system. Memory 425 is depicted as including VMCS portion 430 to store state and/or control information for a VMM and/or guest software running on the system.

Memory Controller 415 is also depicted as coupled to an input/output (I/O) controller 450 by interconnect 445. I/O controller 450 is coupled to storage 460, network interface 465, and input/output devices 470 by interconnect 455. In one embodiment, storage 460 is a hard-drive. In another embodiment storage 460 is a disk drive. In yet another embodiment, storage 460 is any static storage device in the system. In one embodiment, network interface 465 interfaces with a local area network (LAN). In another embodiment, network interface 465 interfaces with a larger network, such as the internet. Input/output devices 470 may include any user input or system related output devices, such as a keyboard, mouse, monitor, or printer.

Figure 5:
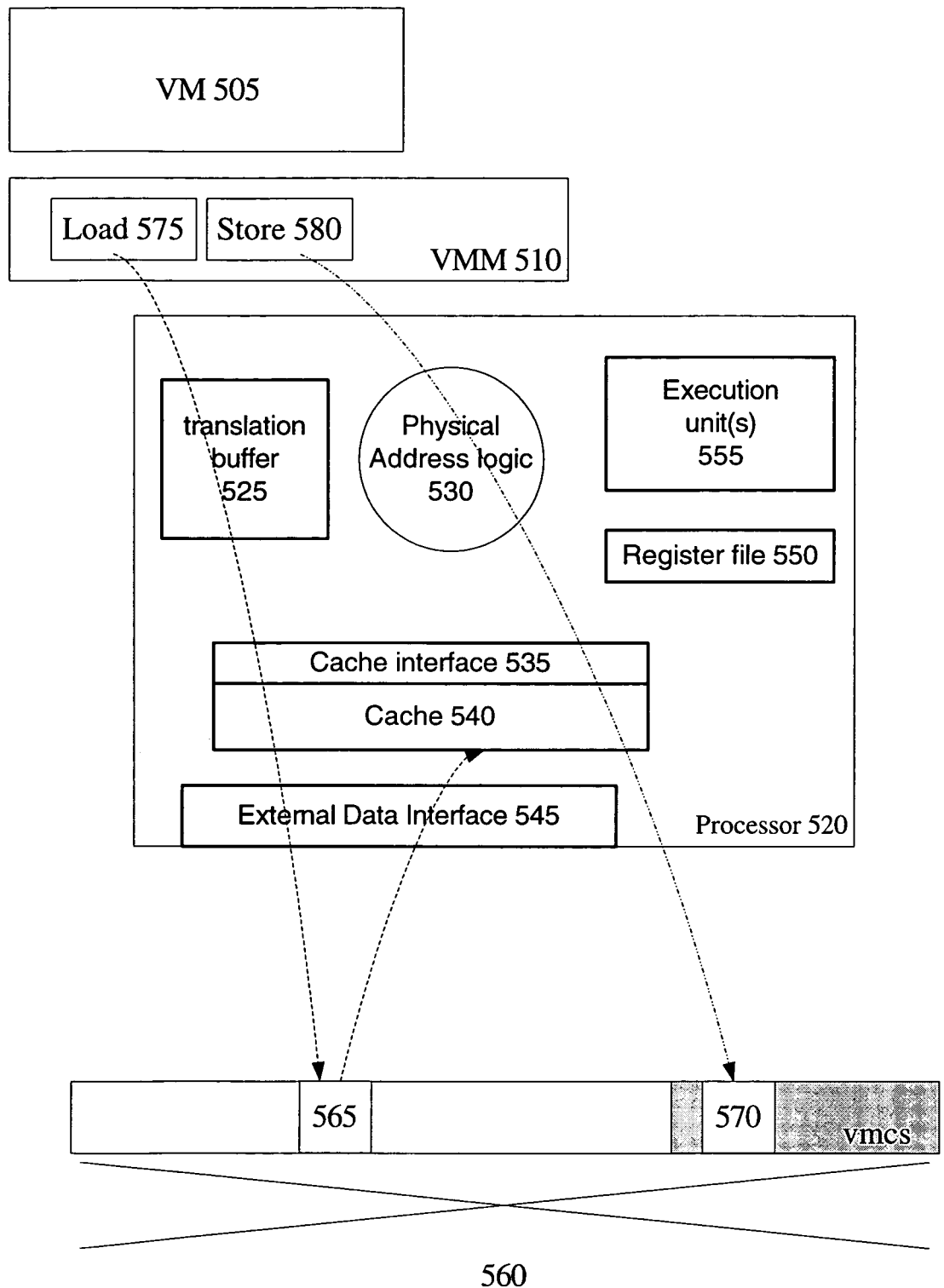
FIG. 5 illustrates an embodiment of an instruction linearly addressing a memory location and an instruction physically addressing a memory location.

Referring to FIG. 5, an example of loading an element from memory and storing an element in memory is illustrated. A first instruction, such as load 575, from VMM 510 includes an operation to load a first element from a first virtual/linear memory address. In one embodiment, the first element is an instruction. In another embodiment, the second element is a data operand. In a third embodiment, the first element is any other element commonly stored in memory. Load 575 is depicted as being generated by VM 505. However, in another embodiment, load 575 is generated by another guest software program running on processor 520. Translation buffer 525 translates the first virtual/linear memory address to a first physical memory address, which references a first memory location, such as first memory location 565 within memory 560. In one embodiment, memory 560 has a plurality of memory cells and first memory location 565 is at least one memory cell within the plurality of memory cells.

Translation buffer 525 also provides the first physical address to a cache interface 535 or directly to external data interface 545. If cache interface 535 receives the request with the first physical address, cache interface 535 checks cache 540 to see if a valid copy of the first element stored in first memory location 565 is present. If a valid copy is present then the first element is loaded into register file 550 or loaded into other processor logic 520. However, if translation buffer directly provided the first physical address to external data interface 545 or a valid copy of the first element within first memory location 565 is not present in cache 540, then external data interface 545 fetches the first element from first memory location 565. Once the first element is fetched, it is stored in cache 540 and/or loaded into register file 550. Register file 550 further loads the first element into execution unit(s) 555 for operation.

In addition, processor 520 fetches or receives a second instruction, such as store 580. Store 580 requests processor 520 to store a second element in a second physical address, which references a second memory location 570. In one embodiment, the second element is the first element previously loaded by load instruction 575. In another embodiment, the second element is a result of an operation on first element 575 executed by execution unit(s) 555 and updated in register file 550 and/or cache 540. In yet another embodiment, the second element is an unrelated element stored in processor 520. As stated above, store instruction 580 may include any representation of second physical address, including an offset to be added to a base address. Physical address logic 530, provides the second physical address to either cache interface 535 and/or external data interface 545 based on the stored memory type. External data interface 545 then writes/stores the element to second memory location 570.

As can be seen from above, if a VMCS portion is maintained in a system memory, physical address logic in a microprocessor allows the microprocessor to receive either multiple instructions or single macro-instruction with references to both linear/virtual memory addresses and physical addresses. Additionally, the microprocessor is able to decode the addresses and provide physical addresses to interface logic to retrieve/load elements from the memory location referenced by the physical addresses without disabling paging, flushing a translation buffer, and re-enabling paging, which typically incurs large execution penalties.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in a illustrative sense rather than a restrictive sense.

What is claimed is:

1. A processor comprising:
   an instruction decode logic to decode one or more instructions into a first operation comprising a reference to a first physical address and a second operation comprising a reference to a linear address in a virtual memory;
   a sequencing logic to receive the first operation and the second operation from the instruction decode logic on an input path, direct the first operation to physical address logic on a first output path, and to direct the second operation to translation logic on a second output path;
   the physical address logic to decode the reference to the first physical address to a representation of the first physical address and to provide the representation of the first physical address to a common interface without disabling paging of the virtual memory for the processor; and
   the translation logic to decode the reference to the linear address to a representation of a second physical address and to provide the representation of the second physical address to the common interface.

2. The processor of claim 1, wherein the reference to the first physical address comprises a coded representation of the first physical address or an offset from a base address and the physical address logic comprises decode logic to determine the representation of the first physical address by decoding the coded representation of the first physical address or adding the offset to the base address.

3. The processor of claim 1, wherein the physical address logic comprises a control register to store an indicator of a cacheable memory type or an un-cacheable memory type.

4. The processor of claim 3, wherein the physical address logic is to:
   responsive to the control register storing an indicator of the cacheable memory type, provide the representation of the first physical address to a cache interface of the common interface; and
   responsive to the control register storing an indicator of the un-cacheable memory type, provide the representation of the first physical address to an external data interface of the common interface.

5. The processor of claim 1, wherein the sequencing logic is to direct the first operation and the second operation in an order in which the first operation and the second operation are decoded.

6. The processor of claim 1, wherein the sequencing logic is to direct the first operation and the second operation out of an order in which the first operation and the second operation are decoded.

7. The processor of claim 1 further comprising one or more execution units to execute the first operation in response to the representation of the first physical address being provided to the common interface and to execute the second operation in response to the representation of the second physical address being provided to the common interface.

8. An integrated circuit comprising:
an input path to receive a first operation comprising a reference to a first physical address and a second operation comprising a reference to a linear address in a virtual memory for a processor;
a first output path to physical address logic, wherein the physical address logic is to decode the reference to the first physical address to a representation of the first physical address and to provide the representation of the first physical address to a common interface without disabling paging of the virtual memory for the processor;
a second output path to translation logic, wherein the translation logic is to decode the reference to the linear address to a representation of a second physical address and to provide the representation of the second physical address to the common interface; and
sequencing logic to direct the first operation on the first output path to the physical address logic and to direct the second operation on the second output path to the translation logic.

9. The integrated circuit of claim 8, wherein the reference to the first physical address comprises a coded representation of the first physical address or an offset from a base address.

10. The integrated circuit of claim 8, wherein the sequencing logic is to direct the first operation and the second operation in an order in which the first operation and the second operation are received on the input path.

11. The integrated circuit of claim 8, wherein the sequencing logic is to direct the first operation and the second operation out of an order in which the first operation and the second operation are received on the input path.

12. The integrated circuit of claim 11, wherein the sequencing logic comprises tracking logic to track a status of execution of the first operation and the second operation.

13. A method comprising:
receiving one or more operations from an instruction decoder of a processor;
for each operation in the one or more operations,
determining whether the operation comprises a reference to a physical type of address or a reference to a linear type of address in a virtual memory for the processor;
directing the operation to physical address logic in response to determining that the operation comprises the reference to the physical type of address, wherein the reference to the physical type of address comprises a reference to a first physical address, and wherein the physical address logic is to decode the reference to the first physical address to a representation of the first physical address and to provide the representation of the first physical address to a common interface without disabling paging of the virtual memory for the processor; and
directing the operation to translation logic in response to determining that the operation comprises the reference to the linear type of address, wherein the reference to the linear type of address comprises a reference to a linear address, and wherein the translation logic is to decode the reference to the linear address to a representation of a second physical address and to provide the representation of the second physical address to the common interface.

14. The method of claim 13, wherein the one or more operations comprise multiple operations and are directed in an order in which the one or more operations are received from the instruction decoder.

15. The method of claim 13, wherein the one or more operations comprise multiple operations and are directed out of an order in which the one or more operations are received from the instruction decoder.

16. The method of claim 13, wherein at least one of the one or more operations that is determined to comprise a reference to a first physical address comprises a coded representation of the first physical address or an offset from a base address.

17. The method of claim 13, further comprising executing the one or more operations in response to the representation of the first physical address or the second physical address being provided to the common interface.

* * * * *